United States Patent [19]

Hunter

[11] Patent Number: 4,877,429

[45] Date of Patent: Oct. 31, 1989

[54] VALVE DEVICE FOR P.S.A. OR R.P.S.A. SYSTEMS

[76] Inventor: Donald W. Hunter, 3516 Cedar La., Guntersville, Ala. 35976

[21] Appl. No.: 319,095

[22] Filed: Mar. 6, 1989

[51] Int. Cl.$^4$ .................................................. B01D 53/04
[52] U.S. Cl. ............................................ 55/162; 55/58; 55/179
[58] Field of Search ............... 55/25, 26, 58, 160–163, 55/179–181

[56] References Cited

U.S. PATENT DOCUMENTS 1,887,606  11/1932  Thomas ................................. 55/162
3,160,486  12/1964  Busch .................................... 55/162

Primary Examiner—Charles Hart
Attorney, Agent, or Firm—Needle & Rosenberg

[57] ABSTRACT

An improvement in a Pressure Swing Adsorption or a Rapid Pressure Swing Adsorption process for separation of a multicomponent feed gas by selectively adsorbing at least one component in an adsorption system having at least two beds, the improvement comprising a rotary poppet valve device that has at least two independent intake/exhaust valve pairs which are sequentially opened and closed by a valve camming actuator.

7 Claims, 5 Drawing Sheets

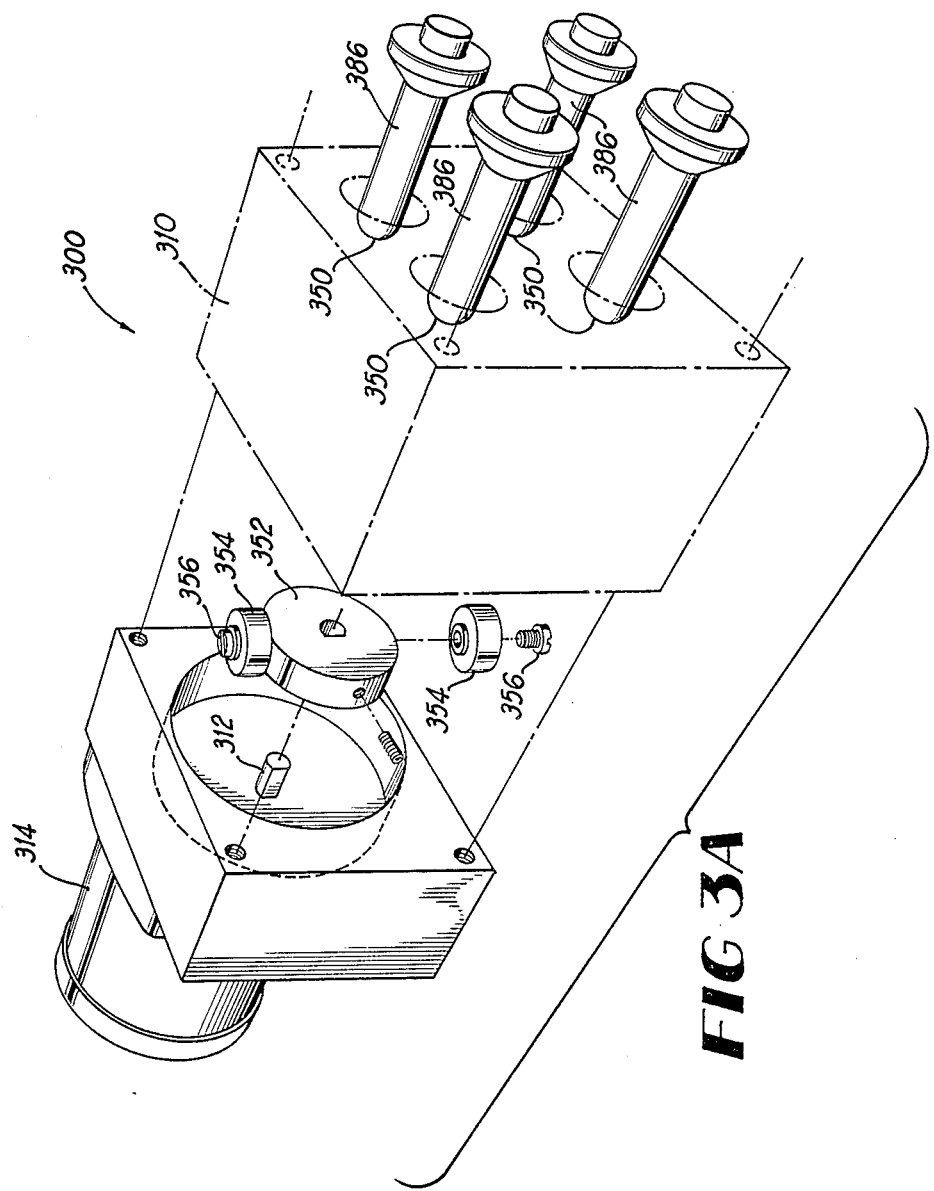

VALVE DEVICE FOR P.S.A. OR R.P.S.A. SYSTEMS

BACKGROUND OF THE INVENTION

This invention relates to Pressure Swing Adsorption (P.S.A.) or Rapid Pressure Swing Adsorption (R.P.S.A.) processes and, more particularly, to a new valve system to control gas flow for R.P.S.A. and P.S.A. systems.

The R.P.S.A. process and the P.S.A. process provide means for producing an oxygen-enriched gas that can be used at high altitude or as a breathing atmosphere by persons suffering from respiratory ailments. Both R.P.S.A. and P.S.A. processes utilize a feed gas mixture that is fed into an adsorbent bed that adsorbs the different gas components to differing degrees so that the more readily adsorbable component is retained in the adsorbant bed. Typically, the feed gas is air and nitrogen is the more readily adsorbable component that is adsorbed out, leaving an oxygen-enriched gas affluent. Examples of prior art which disclose various multiple bed, rapid pressure swing adsorption systems for gases include U.S. Pat. Nos. 4,194,891; and 4,194,892; and 4,406,675.

The cyclic process of a typical R.P.S.A. system includes:

(1) feeding the gas mixture to the feed or intake end of the bed for selective adsorption of the more readily adsorbable gas component with withdrawal of the less readily adsorbable component as a product effluent from the opposite or discharge end of the bed, (2) countercurrently depressurizing the bed, with the more readily adsorbable gas component thereby being exhausted through the feed end of the bed, and (3) repressurizing the bed from the lower pressure reached during countercurrent depressurization to a higher intermediate pressure or to the high final adsorption pressure for the adsorption of the more readily adsorbable component from additional quantities of the feed gas mixture during the next processing cycle in the bed.

A pair of valves is required to cycle the gas mixture into and out of a one-adsorber bed system. Because of the intermittent flow of fluid with only one bed, typical systems utilize two adsorber beds and a set of four valves. These systems typically utilize solenoid actuated, four-way, three-way, or two-way pneumatic valves. A controlled timer or other electronic device is required to control the timing cycle. The most commonly used valve is the sliding spool, four-way valve that is solenoid actuated as commonly used in industrial applications.

However, the solenoid actuated sliding spool type valves are prone to stick in position. In addition, these valves are expensive to operate since they require some system pressure to move the spool and require the significant additional cost of providing an electrical controller for the timing. Solenoid valves also produce a loud popping sound when actuated. This must be muffled or attenuated in medical and industrial applications.

An object of the present invention is to provide a valve system for the operation of R.S.P.A. and P.S.A. systems.

A further object of the invention is to provide such a valve system that is more reliable than those presently available; can be operated at a lower cost; is less costly to construct; and that operates with a significantly lower noise level than valves presently available.

SUMMARY OF THE INVENTION

The above-described disadvantages of the prior art are overcome by the present invention which comprises a rotary poppet valving device containing a minimum of four valve cavities which are structured to provide two independent valve pairs. Each valve pair controls the gas separation process for an associated adsorption bed of a R.P.S.A. system.

Each pair consists of an intake valve and an exhaust valve. The intake chambers of each intake valve receives pressurized feed gas therein such that, at any one time, at least one intake chamber is charged. Each of the exhaust chambers of the exhaust valves has a gas line leading therefrom to the infeed side of an adsorbent bed. The exhaust valve ports receive product gas from the infeed side of a bed and vent that gas to the atmosphere.

A camming system acts on the valve stems of the respective valves to sequentially open a first intake valve of one pair and a first exhaust valve of the other pair of valves. At that time, feed air enters the first intake valve, moves through a passageway interconnecting the first intake valve with the second exhaust valve and exits the device to travel into the infeed end of a first adsorbent bed. Simultaneously, product gas from the second bed enters the first exhaust valve and is discharged therefrom into the atmosphere.

The first intake and exhaust valves are then closed, so that during this phase of the valving sequence, all of the valves are in a closed position so that feed gas ca penetrate further into the first bed and the second bed can become repressurized.

In the third phase of the sequence, the second intake valve and the second exhaust valve are opened whereby feed gas enters the second intake valve and travels to the infeed end of the second bed through the exhaust chamber of the first exhaust valve. Also, product gas from the first bed enters the second exhaust valve whereby it is then vented to the atmosphere.

During the fourth phase, all of the valves again remain closed, this time allowing the first bed to repressurize and the feed gas to further penetrate the second bed. The cycle is then repeated.

In the first and second embodiments of the present invention, the valve pairs are in a juxtaposed relationship within the valve body. The valve actuating means of the first embodiment comprises a cam and cam shaft which is powered by an electrical gear motor. The cam includes lobes thereon which, upon rotation, contact actuator balls which are aligned with the ends of the valve stems of each valve, the other ends of the valve stems being spring-biased, thereby forcing open the poppet of each associated valve until the cam moves out of engagement with the ball. The valve is then urged into its closed position by the action of the spring.

In the second embodiment, the actuator balls are replaced by having the end of each valve stem being rounded in shape to present a camming surface for the cam lobes.

A third embodiment is a stackable modular version of the valve device for ready applicability to multi-bed operations. In this embodiment, the valve pairs are in an opposed relationship within the valve body with the valve actuating means being disposed therebetween.

The rotary poppet valve of the present invention is a highly reliable valve which controls P.S.A. or R.P.S.A.

processes with minimum cost. Unlike the normal control valve, the current invention does not require a timer or electrical control system. In addition, the "up" and "down" motion of the thrust bearing cam arrangement substantially reduces valve cavity seal wear and attenuates valve actuation noise. Also, the same valving technique for a 2-bed operation can be accomplished with a multiple bed operation.

An object of the present invention is to provide a valve system for the operation of R.S.P.A. and P.S.A. systems.

A further object of the invention is to provide such a valve system that is more reliable than those presently available; can be operated at a lower cost; is less costly to construct; and that operates with a significantly lower noise level than valves presently available.

BRIEF DESCRIPTION OF THE FIGURES OF THE DRAWINGS

FIG. 3A is an exploded perspective view of the second embodiment of the present invention showing some elements common to the first embodiment in a schematic manner;

DETAILED DESCRIPTION OF ILLUSTRATIVE EMBODIMENTS

A. PRIOR ART SYSTEM

Figure 1:
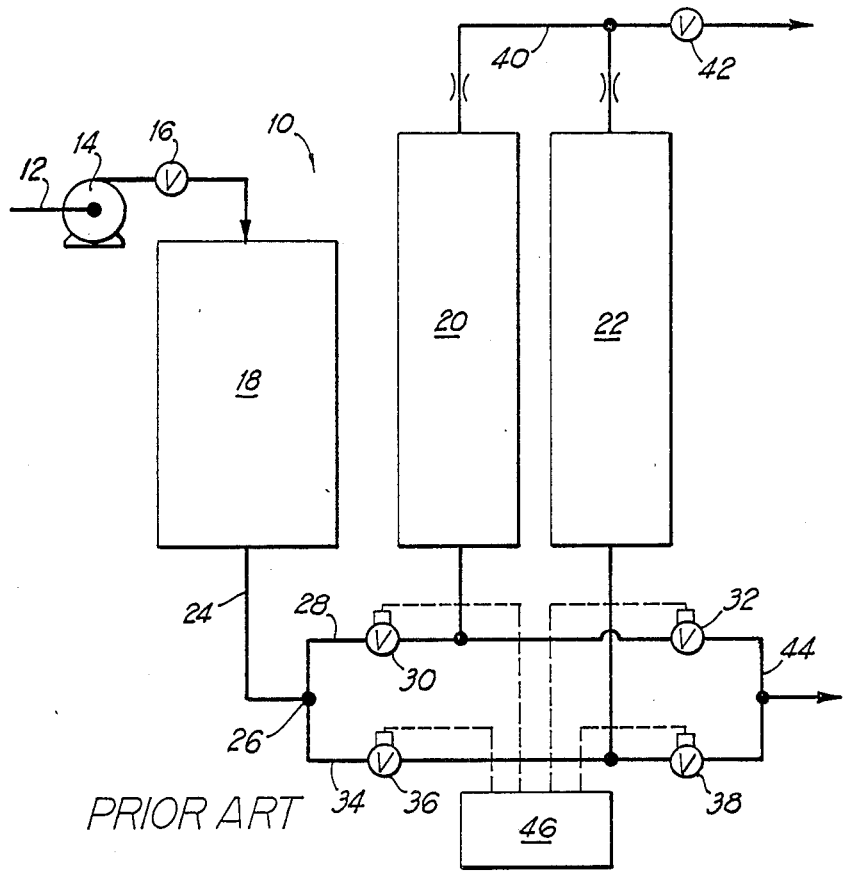
FIG. 1 is a schematic view of an existing R.P.S.A. two-bed system with associated prior art independent valves and controller.

FIG. 1 is a block diagram depicting a conventional two-bed R.P.S.A. system 10 as, for example, disclosed in U.S. Pat. No. 4,194,891 to Earls et al. Feed air is introduced through conduit 12, pressurized by pump 14 and passed through check valve 16 to accumulator or feed surge tank 18 to stabilize the feed pressure and smooth out the feed to the adsorbent beds 20, 22. The pressurized air flows from tank 18 through line 24 to a manifold 26 having feed line 28 with feed air inlet valve 30 and exhaust valve 32 for bed 20 and feed line 34 with feed air inlet valve 36 and exhaust valve 38 for bed 22. Exhaust valves 32, 38 may be open to the atmosphere through exhaust line 44. The product gas flows from the outlet ends of the beds 20, 22 through the product line 40 which has flow control valve 42 thereon. Timer 46 selectively opens and closes the solenoid actuated valves 30, 32, 36, 38.

In operation, the pressurized gas containing at least two separable components enters lines 28, 34 through manifold 26. At that time, inlet valve 30 for bed 20 is open and inlet valve 36 for bed 22 is closed. Also at that time, exhaust valve 32 for bed 20 is closed and exhaust valve 38 for bed 22 is open. It will be understood that valves 30, 32 and valves 37, 38 are mechanically structured and linked through timer 46 to provide two independent valve pairs, each of which controls the gas separation process for an associated adsorption bed.

With inlet valve 30 open, the feed gas enters the inlet side of bed 20 during a selected feed gas introduction period wherein the more readily adsorbable component of the feed gas is adsorbed while the less readily adsorbable component exits the bed 20 through the product line 40. Valve 42 remains open during the hereindescribed cyclic process so that the product gas, such as oxygen, is continuously released from the system from the respective outlet end of either bed 20 or bed 22.

While inlet valve 30 remains open, exhaust valve 38 also remains open to allow a depressurization of bed 22 (which has previously completed its 4-step cycle or sequence of feed, delay/repressurization, exhaust and delay/repressurization) to occur by the countercurrent flow of the product gas therethrough which purges the more readily adsorbable gas component from the bed 22 out through its inlet end and hence through exhaust valve 38 to the atmosphere through line 44. Alternatively, exhaust line 44 could lead to a storage area if the readily adsorbable gas component was also a desired product of the system.

The timer 44 signals the next phase of the cycle, namely, the flow suspension or delay portion, whereby all of the valves 30, 32, 36, 38 are in a closed position. Flow of the feed gas is thereby suspended to bed 20 to allow the pressurized feed gas that just entered the bed 20 to penetrate further into the adsorbent bed before the exhaust portion of the cycle for bed 20 is started. Simultaneously, the closing of exhaust valve 38 during this delay portion allows bed 22 to repressurize before it receives feed gas through inlet valve 36 when it is opened during the next immediate sequence of the cycle.

The timer 46 actuates the next sequence of the cycle whereby inlet valve 36 and outlet valve 32 are opened and inlet valve 32 and outlet valve 38 are closed. As a result, feed gas enters bed 22 through associated inlet valve 36 and the desorbed component of the feed gas is removed from bed 20 through exhaust valve 32.

The final phase of the sequence occurs when valves 36 and 32 are closed, with valves 30 and 38 also remaining closed thereby allowing repressurization of the beds 20, 22 to take place. The cycle is then repeated.

From the above description, it is clear that the control sequence is a repetitive process, occurring for both adsorbent beds of a conventional two-bed R.P.S.A. system. However, the feed and exhaust cycles for each bed 20, 22 occur in alternating gas flow sequence, assuring a constant flow of product gas.

The present invention is an improvement over the individual valves 30, 32, 36, 38 and timer 46 of the prior art in that it essentially combines all of those elements into one compact valve component which is utilized into the above-described R.P.S.A. system 10.

B. DESCRIPTION OF THE FIRST EMBODIMENT

Figure 3:
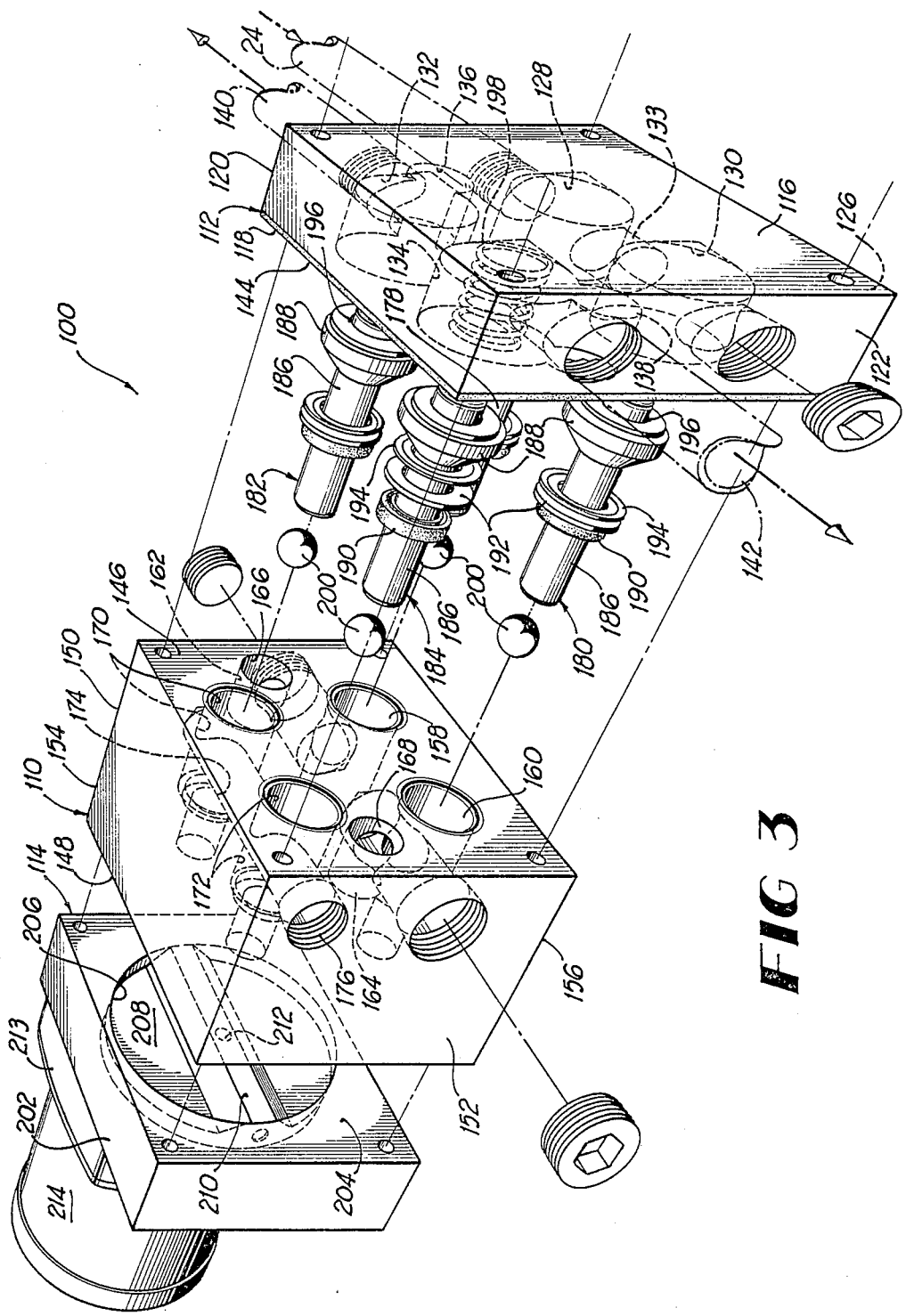
FIG. 3 is an exploded perspective view of the first embodiment of the present invention with certain elements shown in phantom lines.
Figure 4:
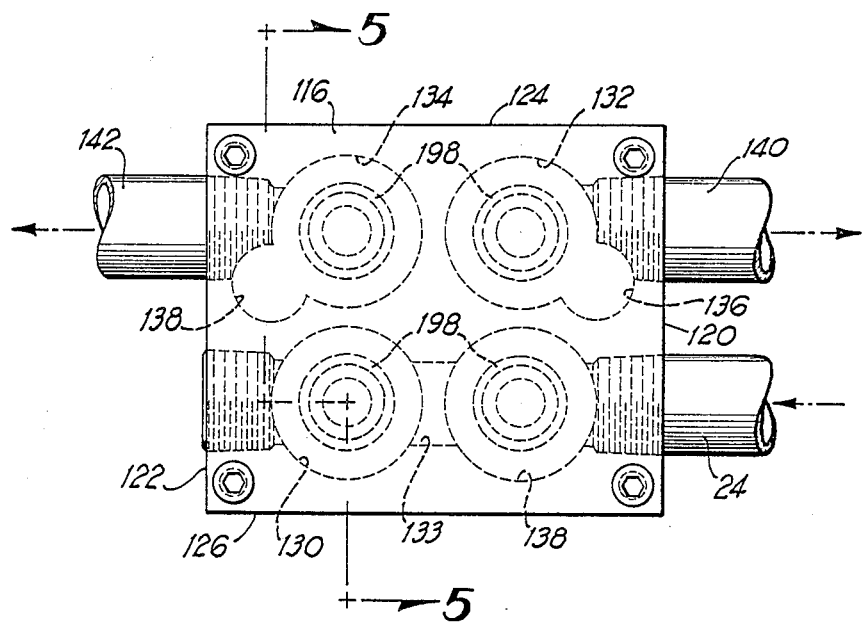
FIG. 4 is an end view of the first embodiment of the present invention showing some internal elements in phantom lines.
Figure 5:
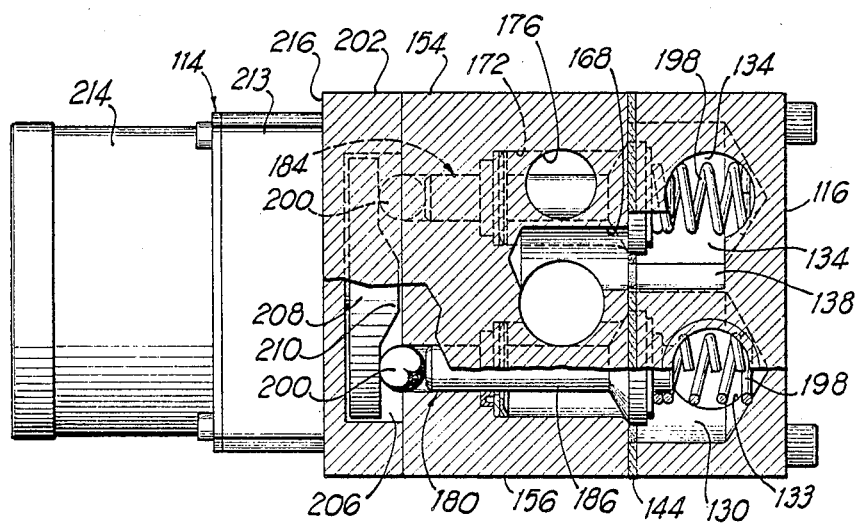
FIG. 5 is a side elevational view of the first embodiment of the present invention taken along line 5—5 in FIG. 4.

Referring to FIGS. 3-5, the first embodiment of the present invention is denoted generally by the numeral 100 and is comprised of a rectangular-shaped, ported valve body 110 connected at one of its ends to a valve body cap 112 and, at its other end, to a motorized camming portion 114.

The valve body cap 112 has front and back walls 116, 118 joined by vertical sides 120, 122, top 124 and bottom 126. The pressurized feed air is received into the device 100 through line 24 which is complimentarily threaded at its outflow end to threads about the intake port in side 120. The intake port communicates with the cylindrical intake valve chambers 128, 130 that are joined together by conduit 133. The open ends of the chambers 128, 130 extend through back wall 118.

Positioned above intake chambers 128, 130 and within the valve body cap are exhaust chambers 132, 134 having respective lobes 136, 138. Chambers 132, 134 and lobes 136, 138 extend through the back wall 118. Lines 140, 142 are threadedly received into the respective interiors of exhaust chambers 132 134 with line 140 connected to the intake end of bed 20 and with line 142 communicating with the intake end of bed 22.

A gasket 144 is positioned between back wall 118 and the forward face 146 of valve body 110 to maintain a fluid-tight seal when the valve body cap 112 is joined to valve body 110. The valve body 110 also includes a rear face 148, side walls 150, 152, top 154 and bottom 156. Cylindrical intake valve ports 158, 160 which extend through the forward face 146 are in registry with the open ends of the respective intake valve chambers 128, 130. As more clearly seen in FIG. 5, the rear portions of ports 158, 160 each have a reduced diameter section which exit through rear face 148. Passageways are formed from the interior of the intake valve ports 158, 160 to the exhaust chambers 132, 134 by means of elbow-shaped conduits 162, 164 in the respective intake valve ports 158, 160 communicating with exhaust chambers 132, 134 through openings 166, 168 which are in registry with lobes 136, 138, respectively.

A pair of cylindrical exhaust valve ports 170, 172 are positioned above and in vertical alignment with the intake valve ports 158, 160 and have exterior dimensions being identical to the ports 158, 160. The valve exhaust ports 170, 172 are in registry with respective exhaust chambers 134, 132. Means are provided for evacuating the interiors of the exhaust valve ports 170, 172 and include an exhaust manifold 174 which laterally extending through the exhaust valve ports 170, 172 and which exits to the atmosphere through side wall 152 by means of exhaust port 176. Also, the manifold 174 could be deleted with each exhaust valve port 170, 172 having its own exhaust port.

Referring to FIG. 3, poppet valves 178, 180, 182, 184 are provided in intake and exhaust valve ports, 158, 160 170, 172, respectively, each comprising elongated, cylindrical valve stems 186 which are joined to valve heads 188. Located on each of the valve stems 186 are a valve seal 190, a valve seal washer 192 and a valve seal retainer 194. Positioned to the rear of the valve head 188 is a spring retainer lug 196 which engages a valve spring 198 that is contained in each of the intake and exhaust chambers 128, 130, 132, 134. A valve actuator ball 200 is located at the flat, forward end of each valve stem 186 and projects beyond rear face 148 when the valves 178, 180, 182, 184 are in check closed positions seen in FIG. 5. The valves 178, 180, 182, 184 are normally urged into a closed position by the springs 198.

The motorized camming portion 114 is the last section of the valve device 100 and includes a rectangular-shaped cam body and motor mount 202 having a front face 204 that contacts rear face 148. A cylindrical cavity 206 is formed through front face 204 with a diameter sufficient to encompass all of the valve actuator balls 200 and a depth sufficient to receive therein valve cam 208 having lobe 210 diametrically positioned thereacross. As seen in FIG. 5, when the device 100 is at rest, the valve actuator balls 200 engage the forward surface of the valve cam 208. The cam 208 is mounted on rotable shaft 212 that extends from the gear head 213 of cam motor 214 which is mounted to the rear face 216 of cam body and motor mount 202.

C. OPERATION OF THE FIRST EMBODIMENT

In its operation, the device 100 provides for two independent valve pairs, each intake exhaust valve pair controlling the gas separation process for an associated adsorption bed. In device 100, the valve pairs are diagonally located from each other so that intake valve 178 is paired with exhaust valve 184 and intake valve 180 is paired with exhaust valve 182.

Referring to FIG. 5, the valve pairs are in the closed position, with the associated valve poppets of valves 178, 180, 182, 184 being seated within the respective valve cavities by the action of the springs 198. The valve poppets of intake valves 178, 180 are also urged into sealing engagement with their respective cavities as a result of the continual charging of chambers 128, 130 by pressurized feed gas entering therein through feed line 24.

With motor 214 engaged, shaft 212 rotates clockwise with cam lobe 210 contacting balls 200 associated with intake valve 178 and exhaust valve 184. The balls 200 push against the front of the respective valve stems 186 which thereby unseats the respective poppet valve heads 188 of that pair of valves 178, 184. Feed air from chamber 128 enters valve port 158, travels through conduit 162 to lobe 138, into exhaust chamber 134 and out through exhaust line 142 to bed 20.

Product gas which has countercurrently purged bed 22 and has entered exhaust chamber 134 through line 142 is now allowed to enter exhaust valve port 172 where it escapes to the atmosphere through exhaust port 176. As cam 208 continues to rotate, lobe 210 moves out of engagement with the balls of valves 178, 18, allowing those valves to be urged into their closed position. At that time in the cycle, all of the valves 178, 180, 182, 184 are in a closed position, with the feed gas penetrating further into bed 20 and with bed 22 repressurizing, as described above for prior art system 10.

The lobe 210 then moves to contact the actuator balls 200 for intake valve 180 and exhaust valve 182, with valves 178, 180 remaining closed. As intake valve 180 opens, feed air within chamber 130 enters valve port 160, passes into exhaust chamber 134 through conduit 164 and lobe 136, enters line 142 and passes into the intake end of bed 22. Simultaneously, product gas from bed 20 comes into exhaust chamber 132 through line 140, passes into exhaust valve port 170, moves into exhaust port 176 and out of the device 100 into the atmosphere.

When the lobe 210 moves out of engagement with the actuator balls 200 of valves 180, 182, all four of the valves 178, 180, 182, 184 again remain closed before lobe 210 rotates around to contact the balls 210 associated with valves 178, 184 to repeat the cycle.

Figure 2:
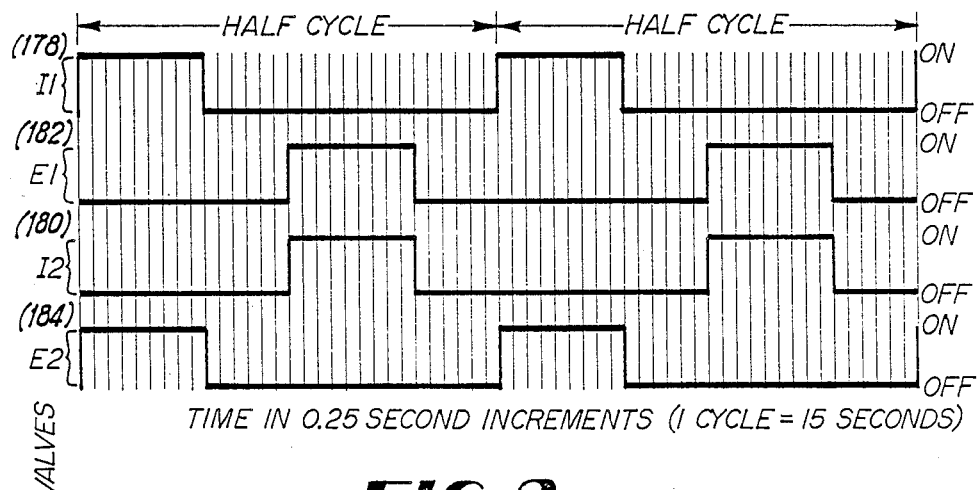
FIG. 2 is a timing diagram showing the sequential nature of the R.P.S.A. operation.

FIG. 2 illustrates the above-described sequence which is shown to take 7.5 seconds to complete (i.e., a "half cycle"). A line is used for each valve and designates when each valve is opened ("up") and closed ("down") with respect to each other during a cycle. FIG. 2 also shows the valve pairing of device 100 with valves 178, 184 being open for 2.25 seconds, all valves being closed for 1.5 seconds, valves 180, 182 being open for 2.25 seconds and then all valves being off for 1.5 seconds before the cycle is repeated. Thus, a complete revolution of the lobe 210 occurs every 15 seconds. Of course, these times may be readily adjusted by varying the rotational speed of the lobe 210.

D. SECOND EMBODIMENT

The second embodiment of the present invention is shown in FIG. 3A and is designated generally by the numeral 300 having valve body 310 and valve actuating means 314 (a valve body cap is not shown. The valve porting is identical to the first embodiment 100 of FIGS. 3–5. The differences are that there are no actuator balls 200 but, instead, the ends of the valve stems 386 have rounded heads 350. A further difference is in the valve actuator means. The camming sequence occurs as a result of a cam collar 352, which is concentrically mounted on shaft 312 that is connected to motor 314, contacting the heads 350. Roller bearing cams 354 are mounted on the exterior surface of cam collar 352 in diametrically opposed relationship by means of mounting screws 356.

As the shaft 212 rotates, the cam collars 352 engage the heads 350 of a respective pair of intake exhaust valves, causing those spring-biased valves to open, with the other intake/exhaust valve pair remaining closed until their respective heads 350 are also contacted by cam collars 352. The rapid adiabatic pressure swing process for device 300 is identical as to that described for the first embodiment 100 and as illustrated in the timing sequence shown in FIG. 2.

E. THIRD EMBODIMENT

Figure 6:
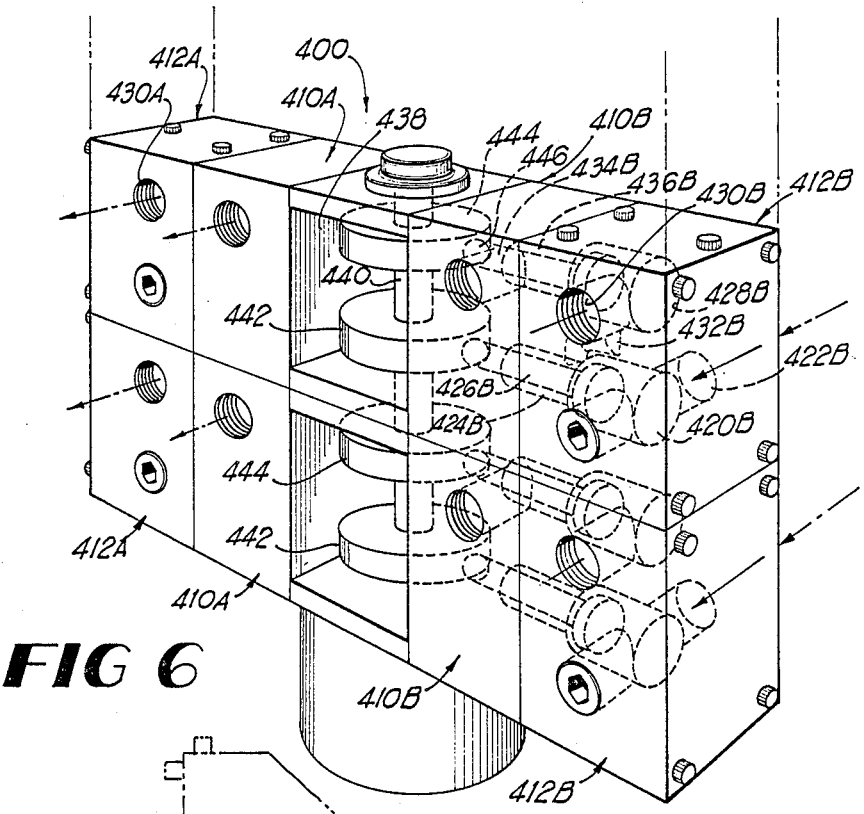
FIG. 6 is a perspective view of the third embodiment of the present invention showing certain elements of the internal valves in schematic fashion.
Figure 7:
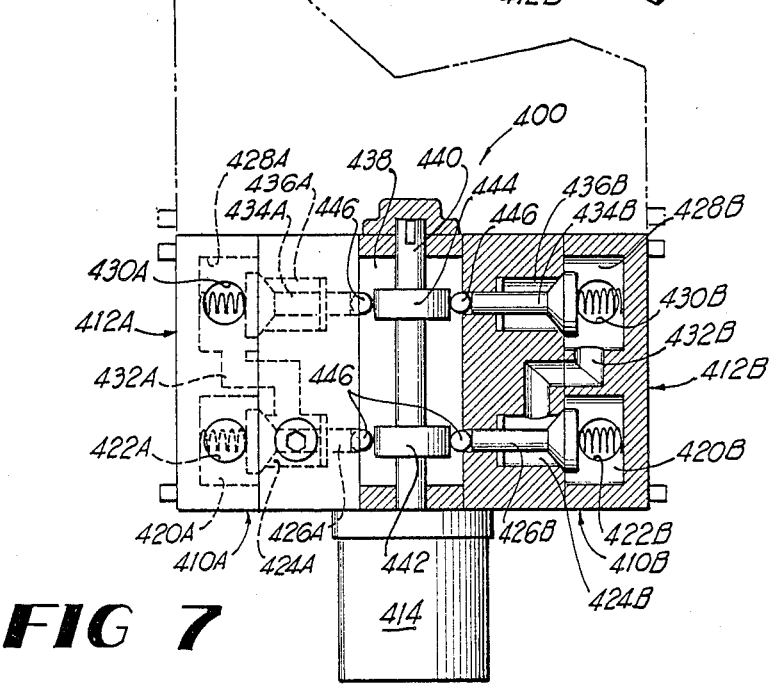
FIG. 7 is a side elevational view of the third embodiment of the present invention illustrating one side of the device in a vertical cross-sectional view.

The third embodiment of the present invention is denoted generally by the numeral 400 in FIGS. 6 and 7 and is a stacked arrangement of modular pairs of intake valves and exhaust valves with each pair of the valves being in opposed relationship to each other, the valve actuating means being disposed therebetween. This construction allows the valving system to be utilized for multiple adsorbent bed processes.

The valve device 400 depicts the same elements as described above for the first embodiment 100 but in a different arrangement. A module of the embodiment 400 is shown in FIG. 7 and includes a pair of valve caps 412 A, B and valve bodies 410 A, B. Each pair contains one intake chamber 420 A, B having an intake of pressurized feed air 422 A, B and an intake valve port 424 A, B with an intake valve 426 A, B therein. Since the intake chambers 420 A, B are not joined as in the first and second embodiments, each chamber 420 A, B requires its separate pressurized gas feed line. Above each intake valve is an exhaust valve comprising an exhaust chamber 428 A, B having conduits 430 A, B leading therefrom to the intake ends of respective adsorbent beds. A passageway 432 A, B interconnects the interior of the intake valve port 424 A, B with the exhaust chamber 428 A, B. Exhaust valves 434 A, B are disposed within the exhaust intake ports 436 A, B that each have an exhaust port (not shown) which communicates with the atmosphere.

The valve actuating means is located within cavity 438 formed between the opposed valve bodies 410 A, B and comprises a shaft 440 extending from motor 414. Disposed on the shaft 440 in spaced relationship are a pair of cams 442, 444 having camming surfaces thereon which cyclically engage the actuator balls 446 as shaft 440 rotates.

As with the other embodiments, there is a pair of intake/exhaust valves that operate together. Intake valve 424 A an exhaust valve 434 B comprise one pair and intake valve 424 B and exhaust valve 434 A comprise the other. The timing sequence of FIG. 2 reflects the same valve openings and closings of the third embodiment 300 as for the first embodiment 100.

What I claim is:

1. An improvement in a rapid pressure swing adsorption process for separation of a multicomponent feed gas by selectively adsorbing at least one component in an adsorption system having at least first and second adsorption beds, the improvement comprising:
   a valve device positioned between said feed gas and said adsorption beds, comprising:
   (a) a valve cover having front and rear walls;
      (i) a pair of intake chambers in said valve cover in fluid communication with each other, each of said intake chamber having an opening through said rear wall of said valve cover;
      (ii) a feed intake line into one of said intake chambers;
      (iii) a pair of exhaust chambers in said valve cover, each of said exhaust chambers having an opening through said rear wall of said cover;
      (iv) a first conduit with one of its ends extending into one of said exhaust chambers and its other end being in the intake side of said first adsorption bed;
      (v) a second conduit with one of its ends extending into the other of said exhaust chambers and its other end being in the intake side of said second adsorption bed;
   (b) a valve body having a front face and rear face, said front face being juxtaposed to said rear wall of said valve cover, said valve body having
      (i) a pair of intake valve ports extending through said front and rear faces the ends of each of said intake valve ports through said front face being in registry with a respective one of said openings through said rear wall for said intake chambers;
      (ii) an intake valve in each of said intake valve ports, said intake valve being normally urged into a closed position and also being movable into an open position;
      (iii) a passageway interconnecting the interior of each of said intake valve ports with one of said intake chambers;
      (iv) a pair of exhaust valve ports extending through said front and rear faces, the ends of each of said exhaust valve ports through said front face being in registry with a respective one of said openings through said rear wall for said chambers;
      (v) means for evacuating said interiors of said exhaust valve ports through said valve body; and
      (vi) an exhaust valve in each of said exhaust valve ports, said exhaust valve being normally urged into a closed position and also being movable into an open position; and
   (c) valve actuating means on said device for effecting a sequence of moving for a first predetermined amount of time a first pair of said valves consisting of one of said intake valves and one of said exhaust valves into said open position while a second pair of said valves consisting of the other of said intake valves and the other of said exhaust valves remains in said closed position, then allowing said first pair of valves to return to said closed positions while said second pair remains closed for a second predetermined amount of time, then moving said second pair of valves into said open positions while said first pair remains closed for a third predetermined amount of time and then allowing said second pair of valves to return to said closed positions while said first pair remains closed for a fourth predetermined amount of time, and repeating said sequence for a selected period of time.

2. An improvement as claimed in claim 1, and further including a spring in each of said intake and exhaust valve ports and a spring in each of said intake and exhaust chambers, the rear of each of said intake and exhaust valves contacting said springs, respectively.

3. An improvement as claimed in claim 2, wherein said valve actuating means comprises an actuator ball positioned in each of said intake and exhaust valve ports, said intake and exhaust valves being positioned between each of said balls and each of said springs; a rotable camming surface positioned adjacent said rear face of said valve body and a motor for rotating said camming surface, whereby said sequence is accomplished by rotation of said camming surface causing contact of said actuator balls of said first pair of said valves so as to push said first pair into said open positions with further rotation of said camming surface moving said surface out of engagement with said actuator balls of said first pair of said valves so as to allow said springs to urge said first pair of said valves into said closed positions, with further rotation of said camming surface contacting said actuator balls of said second pair of said valves so as to push said second pair into said open positions and with further rotation of said camming surface moving said surface out of engagement with said actuator balls of said second pair of said valves so as to allow said springs to urge said second pair of said valves into said closed positions.

4. An improvement as claimed in claim 1, wherein said intake chambers and said intake valve ports are positioned within said valve device in a first horizontal plane and wherein said exhaust chambers and said exhaust valve ports are positioned within said valve device in a second horizontal plane.

5. An improvement as claimed in claim 1, wherein said intake chambers and said intake valve ports are juxtaposed to each other in a first horizontal plane within said valve device and wherein said exhaust chambers and said exhaust valve ports are juxtaposed to each other in a second horizontal plane within said valve device.

6. An improvement as claimed in claim 4, wherein said second horizontal plane is above said first horizontal plane whereby each of said exhaust chambers is positioned above a respective one of said intake chambers, and wherein one of said intake chambers and one of said exhaust chambers are positioned within said device in opposed relationship to the other of said intake chambers and said exhaust chambers, said valve actuating means being disposed therebetween.

7. An improvement as claimed in claim 2, wherein said intake and said exhaust valves have ends which extend through said rear faces of said intake and exhaust valve ports, said ends being rounded in shape and wherein said valve actuating means comprises a rotatable camming surface positioned adjacent said rear faces, wherein said surface engages a selected pair of said ends of said intake and exhaust valves.

* * * * *